UNITED STATES PATENT OFFICE.

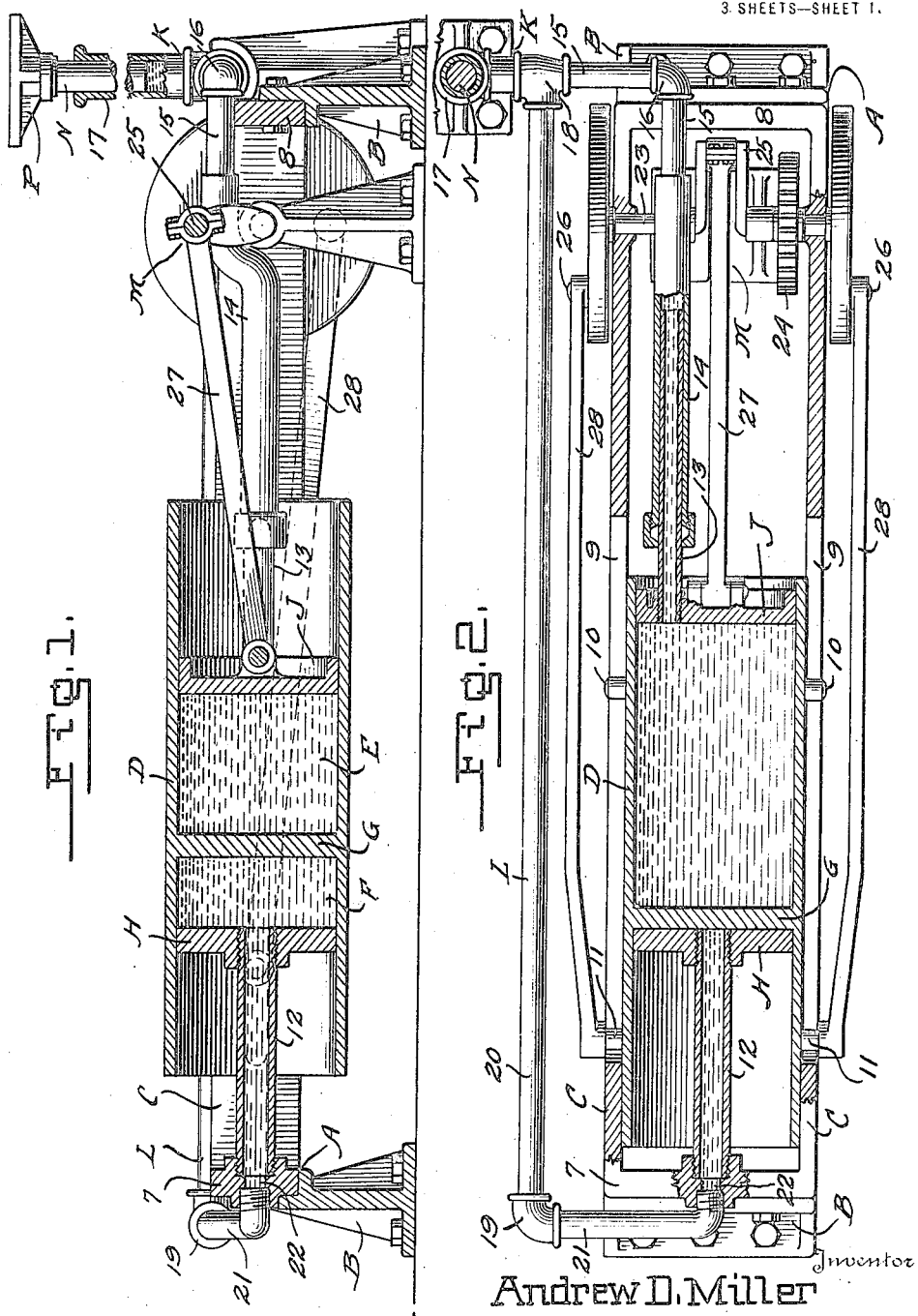

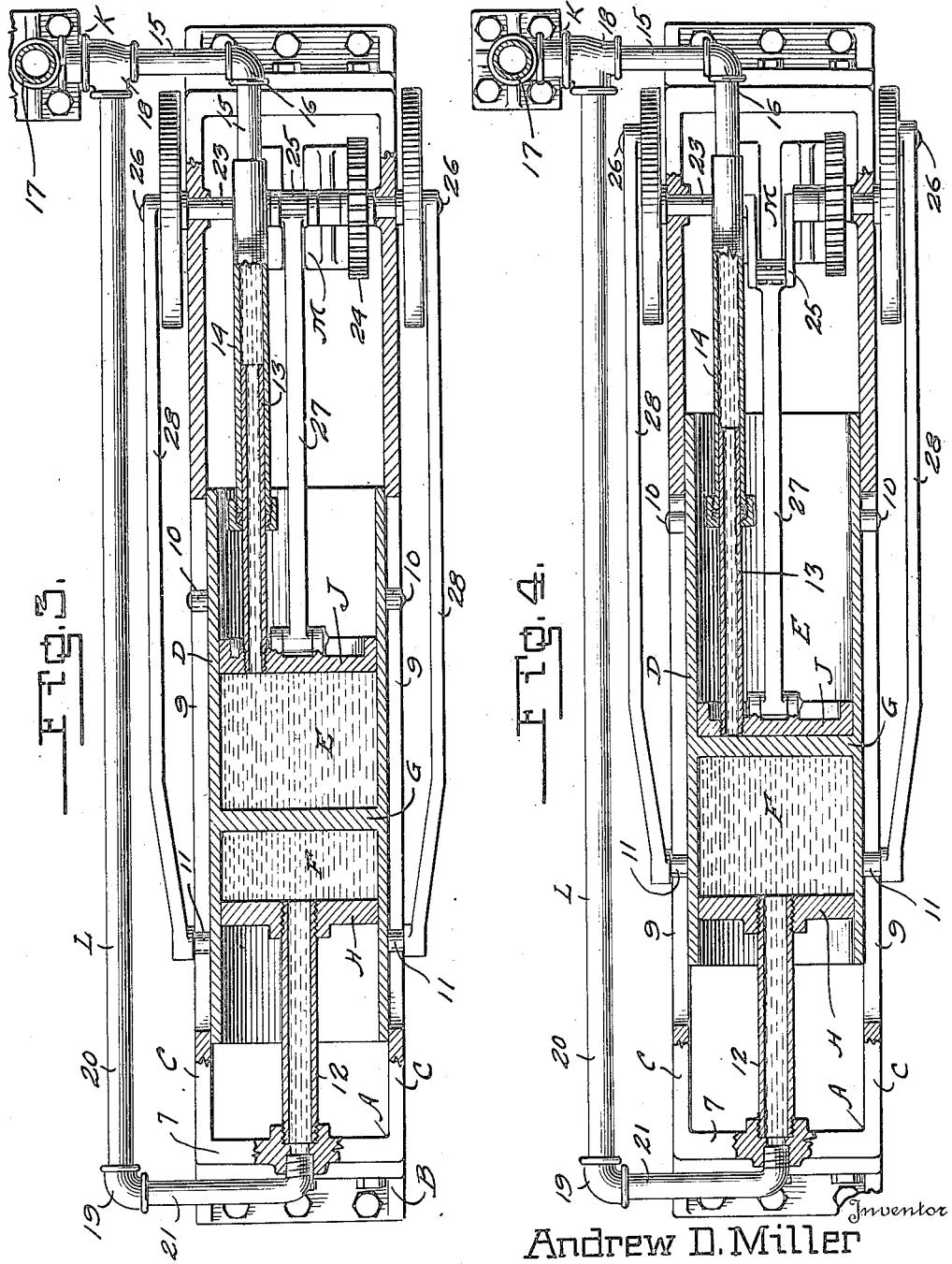

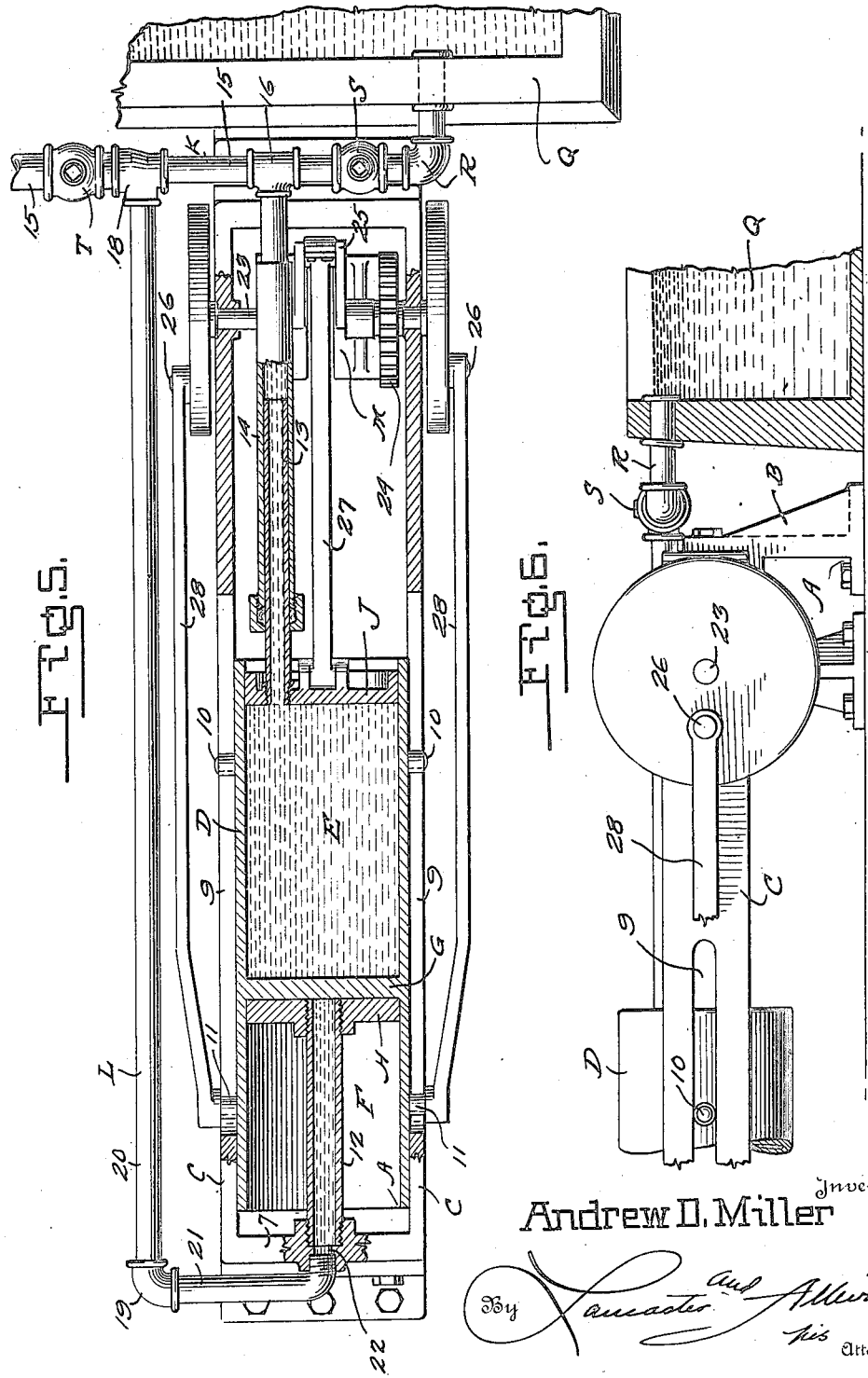

ANDREW D. MILLER, OF JOHNSTOWN, PENNSYLVANIA.

FLUID ACTUATING AND CONTROL ENGINE.

1,372,764.  Specification of Letters Patent.  Patented Mar. 29, 1921.

Application filed July 2, 1920. Serial No. 393,496.

*To all whom it may concern:*

Be it known that I, ANDREW D. MILLER, a citizen of the United States, residing at Johnstown, in the county of Cambria and State of Pennsylvania, have invented certain new and useful Fluid Actuating and Control Engines, of which the following is a specification.

The present invention relates to a fluid actuating and control engine by which a fluid may be compressed or actuated in order to do work and may constitute or form a part of various devices or apparatus, such as an air compressor, press, pump, jack and numerous other devices where air under pressure or movement of a fluid may be utilized in doing work.

One of the principal objects of the invention is to provide mechanism by which work may be accomplished and by which maximum results may be attained with a minimum of effort. That is by use of the principle embodied in my invention there is an increase of power not less than 100%. For instance when utilized as a hydraulic pump it will operate under a return pressure 100% equally dividing resistance and back pressure during operation, without losing any part of the fluid for release in accomplishing this object.

Another object of the invention is to provide mechanism in which forces coming upon the moving parts thereof which might otherwise cause movement counter to that which is imparted thereto are divided in such a manner as to cause the parts to come to rest as soon as movement ceases to be imparted to the parts through some exterior source, such as a prime mover. For instance if the invention is utilized as a pump for forcing water upwardly and after each succeeding stroke the column of water increases in height, thus increasing resistance, the back pressure is divided in such a manner that the divisions counteract one another and permit the parts to come to rest, or assume static condition at any point during a sphere of movement as soon as the prime mover ceases to impart movement to the parts. In this connection the mechanism is particularly well adapted for use as a part of elevator or hoist mechanism providing as it does a quick stop at any desired point, and an equal frictional power to be applied by the prime mover in either raising or lowering the load.

It also provides mechanism by which the prime mover is not subjected to fluctuating resistance during operation as it has but to overcome friction of resistance to movement of the parts in order to do work.

Other objects and advantages of the invention will appear in the following detailed description, taken in connection with the accompanying drawings, forming a part of this specification, and in which drawings:

Figure 1 is a central vertical longitudinal sectional view through an engine used as a hydraulic jack, showing, by way of example, one application of the principle of my invention.

Fig. 2 is a view partly in plan and partly in horizontal section through the same.

Fig. 3 is a similar view to Fig. 2 showing a different position of parts during a sphere of movement.

Fig. 4 is a similar view of Figs. 2 and 3 showing a still different position of parts.

Fig. 5 is a view similar to Fig. 2 showing the application of the principle of my invention to a pump.

Fig. 6 is a fragmentary side elevation of the pump and showing a source of liquid supply in the form of a reservoir in vertical section.

In the drawings where similar characters designate similar parts throughout the several views, A is a suitable frame for parts of the mechanism and includes standards B and spaced parallel rails C; D a reciprocable element, such as a cylinder, providing a major chamber E and a minor chamber F as by a suitable head or partition G in the cylinder, this element slidable in the example shown, between the rails C; H a stationary plunger in minor chamber F with respect to which the element D may move; J a reciprocable plunger in major chamber E; K means providing an outlet way for liquid from major chamber E; L means providing a by pass way from the outlet way to the minor chamber F; and M means for imparting movement to the element D and plunger J simultaneously in counter directions at an equal speed ratio whereby equal amounts of the fluid contents of the major chamber E may be discharged into the minor chamber F through the by pass way in means L, and into the outlet way of means K, during one stroke of the cylinder D and plunger J. In the device shown in Figs. 1 to 4, inclusive, where the principle of the invention is shown applied to a hydraulic jack, N designates a piston having a head P, the piston reciprocable in the outlet way of means K. In the device as shown in Figs. 5 and 6 where the principle of the invention is shown applied to a liquid pump, Q designates a suitable source of liquid supply, such as reservoir; R an inlet way for major chamber E in communication with the source of liquid supply Q; S a device to prevent back flow of liquid through way R; and T a device to prevent back flow of liquid in the outlet way of means K.

In the examples shown the mechanisms are adapted to be disposed in a horizontal position as to the main operating parts, although it is to be understood that this is merely by way of example for these parts may be disposed in a vertical position or inclined, without departing from the spirit of the invention. The spaced parallel rails C may be formed integral with end portions 7 and 8, forming a rectangular frame, mounted upon the standards B, and for a purpose to be subsequently set forth, these rails are provided with longitudinally extending slots 9.

The element D is herein disclosed as a unit of cylindrical shape, having the partition G dividing its bore into major and minor chambers E and F, respectively, these chambers being open at opposite ends of the cylinder, the partition G being relatively nearer one end portion of the cylinder than the other, thus making one chamber relatively larger than the other. The element D is adapted to reciprocate between the rails C, as by the provision of diametrically opposite pins 10 and 11 slidable in the slots 9 of rails C. Thus the element D may be reciprocated with respect to the frame A, being guided in a predetermined path by the slots of the rails of said frame.

The plunger H may be made stationary with respect to frame A, as by a pipe 12, which may form a part of the means L, as hereinafter noted, this pipe being rigidly connected to the plunger H and the end frame member 7, as clearly shown in the drawings. The plunger H is made to engage element D, in the minor chamber F thereof, with fluid tight engagement, and is so positioned that when the cylinder is moved in one direction, the plunger H is in close proximity to partition G, as shown in Figs. 2 and 5 of the drawings.

The plunger J is also adapted for fluid tight engagement with element D and disposed in major chamber E and is reciprocable relative to the cylinder, as hereinafter noted, by means M in a manner that when the cylinder D is moved in an opposite direction from that above noted, this plunger J will come into close proximity with the partition G, as shown in Fig. 4 of the drawings.

The means K providing an outlet way for fluid from the major chamber E, in the example shown, comprises telescopic pipe sections 13 and 14, the former being reciprocable with plunger J and carried thereby, while the latter is stationary, and supported in any suitable manner, by the frame A; suitable pipe sections 15 and fittings 16, such as elbows, for the conducting of fluid from pipe sections 13 and 14, to a vertically disposed pipe section 17 which, in the example shown in Figs. 1 to 4, inclusive, of the drawings constitutes the cylinder in which the plunger N reciprocates.

The means L providing a by-pass way from this outlet means of the major chamber, to the minor chamber may comprise suitable fittings 18 and 19, and pipe sections 20 and 21 in addition to the pipe section 12, the fitting 18 being in the form of a T interposed between pipe sections 15 of means K and from which the pipe sections 20 leads to elbow 19, which is in connection with pipe fitting 21, the latter being, in the example shown in communication with a transverse way 22 in end portion 7 of the frame and open to the bore of pipe 12. Thus, as the plunger J and element D are moved so that said plunger and partition G approach one another a quantity of the fluid in major chamber E is forced into minor chamber F through the means L, while the balance is forced into the upright pipe section 17 of means K.

Any suitable means may be provided for imparting movement to the plunger J and element D, but in the example shown, the means M comprises a crank shaft 23, journaled in frame A, adapted to receive motion, as through gear wheel 24, from any suitable prime mover, not shown in the drawings, this crank shaft having cranks 25 and 26 disposed at diametrically opposite points with respect to its axis; a connecting rod 27 between the crank 25 and plunger J; and one or more connecting rods 28 between the other crank or cranks of the shaft, and the element D, as to the pins 11 thereof. The wrists of the cranks 25 and 26 are at equal distances from the axis of shaft 23, so that as the shaft rotates movement is imparted to the element D and plunger J simultaneously in counter direction at an equal speed ratio, and during the exhausting stroke of the cylinder plunger, from the position of the parts as shown in Fig. 2, where the cranks are on dead center, to the position shown in Fig. 4 of the drawings, the space between the plunger H, which is stationary, and the partion G is increased to an extent 50% of the space between said partition G and movable plunger J, as existed at the beginning of the stroke. Therefore, 50% of the fluid contents of chamber E, which at the beginning of the stroke, is transferred to minor chamber F, and 50% is transferred into the pipe section 17, however, inasmuch as the column of liquid, in the example shown in Figs. 1 to 4 inclusive, where a hydraulic jack is disclosed, may create a pressure in either the major or minor chambers, the pressure upon partition G is equalized, and hence the parts may come to rest or assume a static condition at any point during the sphere of movement, without the weight of the column of liquid in pipe 17, or the load upon head P thereof, having any tendency to actuate the parts. It is thus to be noted that this principle may be applied to a jack, elevator, hoist, or similar mechanisms where it is desired to bring the parts to rest, suddenly, and without the tendency of the load actuating the parts in a direction counter to that in which they may be moved by the prime mover. Furthermore the prime mover is not subjected to fluctuating resistance during operation as it has but to overcome friction of resistance to movement of parts, in order to do work. Equal friction power must be imparted to the means M by the prime mover in either raising or lowering the load, or in increasing or decreasing the pressure in a tank, for instance, since back pressure is equally divided at each side of the main movable object of the mechanism, that is, in the example shown, the partition G of cylinder D.

The engine is therefore at all times in a state of equilibrium in that, when inert, there is a balance between opposing forces, and when in operation there is still this balance between opposing forces, and hence no tendency for the rate or direction of the motion to change incident to accumulated pressure, for the pressure is divided at each side of the main movable object of the engine. This state of equilibrium is important in that, since, with an engine capable of operating and being at all times in a state of equilibrium as to forces, it utilizes the force of gravity for a beneficial purpose,—to permit the fluid actuated, such as a column of water, acted upon by the force of gravity to aid in maintaining this equilibrium and a static condition of parts when the prime mover ceases to actuate parts of the engine.

Where the principle of the invention is applied to mechanisms, such as a pump, suitable devices as hereinbefore referred to, should be provided to check back flow of the fluid. Referring more particularly to Figs. 5 and 6 of the drawings, the device S may be in the form of a check valve interposed between the source of liquid supply Q and the telescopic pipe section 14 and so arranged as to prevent the return of liquid to the reservoir after it has been drawn into the major chamber E, as during the suction stroke of the plunger J and cylinder, while the device T may also be in the nature of a check valve adapted to prevent return of liquid to either the major or minor chambers of the cylinder after once having been forced past the check valve.

The invention is susceptible of application to various uses, especially where a fluid may be compressed or actuated in order to do work and therefore realizing that conditions concurrent with the adoption of this invention will necessarily vary, I desire to emphasize the fact that various minor changes in details of construction, proportions, and arrangement of parts may be resorted to, when desired, without sacrificing any of the advantages of my invention, as defined in the appended claims.

I claim:

1. An engine of the character described comprising in combination, a reciprocable cylinder divided into a major and a minor chamber open at opposite ends of the cylinder, a reciprocable plunger in said major chamber, a stationary plunger in said minor chamber with respect to which said cylinder may move, means providing an outlet way for fluid from said major chamber, means providing a by-pass way for conducting fluid from said outlet way to said minor chamber, and means for imparting movement to said cylinder and movable plunger simultaneously in counter directions at an equal speed ratio whereby equal amounts of the fluid contents of the major chamber may be discharged into the said outlet way and into the said minor chamber through said by-pass way, during a stroke of said cylinder and plunger.

2. An engine of the character described comprising in combination, a reciprocable cylinder divided into a major and a minor chamber open at opposite ends of the cylinder, a reciprocable plunger in said major chamber, a stationary plunger in said minor chamber with respect to which said cylinder may move, means providing an outlet way for fluid from said major chamber, means providing a by-pass way for conducting fluid from said outlet way to said minor chamber, a shaft having cranks set at equal distances from its axis and diametrically opposite one another, a rod connecting one of said cranks with said movable plunger, and a rod connecting the other of said cranks to said cylinder, whereby, upon movement of said shaft, said cylinder and plunger may be simultaneously moved in counter directions at an equal speed ratio whereby equal amounts of the fluid contents of the major chamber may be discharged into the said outlet way and into said minor chamber through said by-pass way, during a stroke of said cylinder and plunger.

3. An engine of the character described comprising in combination, a reciprocable cylinder divided into a major and a minor chamber open at opposite ends of the cylinder, a reciprocable plunger in said major chamber, a stationary plunger in said minor chamber with respect to which said cylinder may move, stationary piping having a section parallel to the axis of movement of said movable plunger, a pipe carried by said movable plunger, open to said major chamber and telescoping said section of said stationary piping, means providing a by-pass way for conducting fluid from said stationary piping to said minor chamber, and means for imparting movement to said cylinder and movable plunger simultaneously in counter directions at an equal speed ratio whereby equal amounts of the fluid contents of the major chamber may be discharged into the said stationary piping and into said minor chamber through said by-pass way, during a stroke of said cylinder and plunger.

4. An engine of the character described comprising in combination, a reciprocable cylinder divided into a major and a minor chamber open at opposite ends of the cylinder, a reciprocable plunger in said major chamber, a stationary plunger in said minor chamber with respect to which said cylinder may move, means providing an outlet way for fluid from said major chamber, means providing a by-pass way for conducting fluid from said outlet way to said minor chamber, a device in said outlet way to prevent return of fluid therefrom into said major and minor chambers, means for imparting movement to said cylinder and movable plunger simultaneously in counter directions at an equal speed ratio whereby equal amounts of the fluid contents of the major chamber may be discharged into the said outlet way and into said minor chamber through said by-pass way, during a stroke of said cylinder and plunger, means providing an inlet way for fluid to said major chamber, and a device to prevent back flow of fluid in said inletway during the power strokes of said cylinder and plunger.

5. An engine of the character described comprising in combination, a reciprocable element providing a major and a minor chamber, having capacities at the ratio of substantially two to one, respectively; a stationary plunger in said minor chamber with respect to which said reciprocable element may be moved, a reciprocable plunger in said major chamber, means providing an outlet way for fluid from said major chamber, a by-pass way for communication of fluid between said outlet way and said minor chamber, and means for imparting movement to said reciprocable chambered element and movable plunger simultaneously in counter directions at an equal speed ratio whereby equal amounts of the fluid contents of the major chamber may be discharged into the said outlet way and into said minor chamber through said by-pass way, during a stroke of said reciprocable element and plunger.

6. An engine of the character described comprising in combination, means providing a way to receive fluid under pressure, and means for actuating fluid for delivery into said way and comprising a reciprocable cylinder having a partition, plungers at opposite sides of said partition, and ways in communication with said first way and the interior of the cylinder at opposite sides of the partition, that pressure therein will act equally upon both sides of said partition.

7. In an engine of the character described, the combination of a conduit for receiving fluid for the purpose of doing work; a reciprocable cylinder and a reciprocable plunger working therein, said cylinder including a head and said head and plunger movable simultaneously toward each other at equal speed ratio for forcing fluid into said conduit; and means for delivering fluid to act upon said cylinder head at its face opposite to said plunger during the said movement of said cylinder and piston to balance the pressure at each side of said head.

ANDREW D. MILLER.